United States Patent [19]

Chan et al.

[11] Patent Number: 5,297,436
[45] Date of Patent: Mar. 29, 1994

[54] OPTICAL FIBRE ULTRASONIC SENSOR

[75] Inventors: Helen L. W. Chan, Beecroft; Kin S. Chiang, Greenwich, both of Australia

[73] Assignee: Commonwealth Scientific and Industrial Research Organization, Australia

[21] Appl. No.: 635,621
[22] PCT Filed: Jul. 20, 1989
[86] PCT No.: PCT/AU89/00307
§ 371 Date: Feb. 25, 1991
§ 102(e) Date: Feb. 25, 1991
[87] PCT Pub. No.: WO90/01149
PCT Pub. Date: Feb. 8, 1990

[30] Foreign Application Priority Data

Jul. 20, 1988 [AU] Australia .................. PI9386

[51] Int. Cl.$^5$ ................. H01J 5/16; G01N 21/00
[52] U.S. Cl. .................. 73/657; 250/227.17; 385/13
[58] Field of Search ............. 73/657, 655; 250/227.17; 385/1, 12, 13; 356/345, 349

[56] References Cited

U.S. PATENT DOCUMENTS

| | | | |
|---|---|---|---|
| 4,293,188 | 10/1981 | McMahon | 350/96 |
| 4,405,198 | 9/1983 | Taylor | 73/655 |
| 4,442,350 | 4/1984 | Rashleigh | 73/657 |
| 4,495,411 | 1/1985 | Rashleigh | 385/13 |
| 4,659,923 | 4/1987 | Hicks, Jr. | 250/227.17 |

FOREIGN PATENT DOCUMENTS

| | | |
|---|---|---|
| 0291404 | 11/1988 | European Pat. Off. |
| 59-40218 | 3/1984 | Japan |
| 63-195529 | 8/1988 | Japan |
| 2181538 | 4/1987 | United Kingdom |

OTHER PUBLICATIONS

"High-Frequency Ultrasonic Sensor Using a Highly Birefringent Optical Fibre" by K. S. Chiang, 7th Optical Fiber Sensor Conference, Sydney, Australia, Dec. 1990.

Kin S. Chiang; "Acousto-optic Interaction in a Highly Birefringent Optical Fiber" Abstract No. 768, pp. 1094-1095 (Oct. 1990).

K. S. Chiang; Technical Article "Optical Fibre Ultrasonic Sensors" A.O.S. News vol. 6, No. 1; pp. 10-13 (Mar. 1992).

Flax et al., "Acoustically Induced Birefringence In Optical Fibers", Optical Society of America, Sep. 1982, pp. 1159-1162. (Sep. 1982).

DePaula et al., "Single-Mode Fiber Ultrasonic Sensor", IEEE Journal of Quantum Electronics, Apr. 1982, pp. 680-683. (Apr. 1982).

DePaula et al., "Broad-Band Ultrasonic Sensor Based On Induced Optical Phase Shifts In Single-Mode Fibers", Journal of Lightwave Technology, Jun. 1983, pp. 390-393. (Jun. 1983).

Primary Examiner—Hezron E. Williams
Assistant Examiner—Rose M. Finley
Attorney, Agent, or Firm—Leydig, Voit & Mayer

[57] ABSTRACT

An ultrasonic sensor utilizing a polarization maintaining optical fibre. The invention includes a polarization maintaining fibre, a light source for launching light beams into the fibre so that the light beams are respectively aligned with each of the principal axes of the fibre, and an output detection system for determining a phase difference induced between the light beams by ultrasonic waves incident upon the fibre. A bias control may be provided to compensate for environmentally induced phase differences. The invention also include a polarization maintaining fibre divided into a sensor portion and a lead portion optically joined together by a 45 degree joint. A light source launches a linear polarized beam into the lead portion in alignment with one of the principal axes and a detection system determines phase difference induced by incident ultrasonic waves between the two components passing through the sensor portion.

17 Claims, 5 Drawing Sheets

OPTICAL FIBRE ULTRASONIC SENSOR

TECHNICAL FIELD

This invention relates to an ultrasonic sensor.

BACKGROUND ART

Ultrasonic sensors have application in the characterisation of high frequency ultrasonic transducers and transducer arrays. This characterisation takes the form of output power measurements and beam profile measurements which determine the spatial distribution of output power. Such measurements also allow the calculation of other required parameters of ultrasonic devices. These measurements are particularly important in relation to ultrasonic devices for medical applications since the total output power and beam profiles must be accurately measured to ensure the safety of patients.

Hitherto the sensing of ultrasound has commonly been based on the use of a piezoelectric active element, such as a polyvinylidene-fluoride film. When the ultrasonic power is very high, this material can lose sensitivity or even become damaged. Additionally, the currently available size of these active elements is too large to resolve very narrow ultrasonic beams generated by highly focusing transducers. For these reasons, conventional hydrophones are not very satisfactory for characterising medical ultrasound that is of high power and highly focused.

A fibre optic ultrasonic sensor based on the use of a single-mode optic fibre has been proposed to alleviate some of these disadvantages. These devices operate on the principle that when an ultrasonic wave in the megahertz range is incident normally upon a single-mode fibre, the fibre becomes anisotropic, and consequently, the polarisation of the light at the output end of the fibre is modulated by the ultrasonic pressure along the fibre and thus varies at the ultrasonic frequency. The difficulty with sensors based on a single-mode fibre is that means must be provided to ensure that the light entering the region of interaction is circularly polarised, and that the optimum bias phase is also maintained at the same time. In practice the latter requires massive feedback control on optical components at both the input and output ends of the fibre to avoid signal fading due to environment disturbances to the fibre. This requirement has limited the application of ultrasonic sensors based on a single mode fibre.

DISCLOSURE OF THE INVENTION

It is an object of this invention to provide an ultrasonic sensor which will overcome, or at least ameliorate, one or more of the abovementioned disadvantages.

Accordingly, in a first aspect this invention consists in an ultrasonic sensor comprising a polarisation maintaining fibre having two orthogonal linear principal axes, an input end and an output end, input means to launch into said fibre light beams respectively aligned with each of said principal axes, and output means to determine the phase difference induced between said beams by ultrasonic waves incident upon the fibre.

The polarisation maintaining fibre is an anisotropic, or birefringent, medium in which there exist two orthogonal or mutually perpendicular principal axes. The light waves linearly polarised along these two axes encounter slightly different refractive indices and therefore propagate at slightly different velocities. Since these two linear polarisations of light do not easily couple to each other, the fibre is said to maintain these two polarisations. The two light waves are termed the polarised modes of the fibre. A single-mode fibre does not possess this property since there is no preferred axis associated with the fibre. The polarisation maintaining fibre used in this invention can be of any known type as long as it maintains linear polarisations. Examples of suitable known polarisation maintaining fibres are the "bow-tie" fibre, PANDA fibre and elloptically clad fibre. The section of the fibre exposed to the ultrasonic field can be jacket-free or coated with any kind of material, depending on specific applications. The overall fibre diameter is preferably made as small as possible to achieve maximum spatial resolution for ultrasonic beam profile measurement.

This invention relies on the principle that when acting upon a polarisation-maintaining fibre, an ultrasonic wave can induce birefringence in the fibre.

According to this invention ultrasonic wave to be measured is preferably incident normally upon the fibre and preferably a principal axis of the fibre, usually the fast axis, is aligned with the propagation direction of the ultrasonic wave. With this fibre orientation, maximum modulation of the difference of principal refractive indices of the fibre is achieved by ultrasonically produced mechanical strains. The phase difference of the two polarised modes is thus modulated by the ultrasonic wave. To measure the phase modulation, these two modes must be excited, preferably with equal intensity, and allowed to interfere with each other at the output end of the fibre.

The necessary interference is preferably achieved by disposing a linear polariser in the path of light emerging from the output end of the fibre and arranging the linear polariser with the principal axis rotationally displaced with respect to the principal axes of the fibre. This produces a light beam comprising an addition of components of the light beams respectively aligned with each of the principal axes of the fibre.

The two polarised modes are preferably excited equally by means of a circularly polarised beam directed to the input end of the fibre. Preferably, means are provided to adjust the phase difference to the two polarised modes to compensate for signal fading due to environmental disturbances. This can, for example, be achieved by tensioning a section of the fibre since the birefringence in a polarisation maintaining fibre is sensitive to mechanical stretching. The advantage of this biasing technique is that no adjustment of either input or output optical components is involved in the compensation. Compensation for signal fading due to environmental disturbances can also be achieved by respectively disposing a quarter wavelength plate and a linear polariser in the path of light emerging from the output end of the fibre and providing means to simultaneously rotate the principal axes of the quarter wavelength plate and linear polariser.

In one preferred form of the invention, a polarisation beam splitter is disposed in the path of light emerging from the output end of the fibre and arranged with one principal axis rotationally displaced with respect to the principal axes of the fibre. This produces two light beams of orthogonal polarisation each comprising an addition of components of light beams respectively aligned with each of the principal axes of the fibre. Preferably the intensity of each of these two light beams is measured by respectively detecting a time varying component and a constant level component of each beam to provide two measure of ultrasonic pressure incident on said fibre. These measurements are then combined preferably, by inverting the phase of one of the electronic signals and adding it to the other to provide a measurement of improved sensitivity.

In a second aspect, this invention consists in an ultrasonic sensor comprising a polarisation maintaining optical fibre having two orthogonal linear principal axes and being divided into a lead portion and a sensor portion optically joined together with the principal axes of each portion rotationally displaced so that a beam aligned with one principal axis of the lead portion travelling from the lead portion to the sensor portion is decomposed into two components respectively aligned with each of the two principal axes in the sensor portion, input means to launch a linearly polarised beam into the lead portion of said fibre in alignment with one of said axes, and output means to determine the phase difference induced between said components by ultrasonic waves incident upon the sensor portion.

For preference, the sensor portion of the fibre is terminated by reflecting means which reflect the components back along the sensor portion. The reflecting means preferably take the form of silvering of the end of the optical fibre. At the joint between the sensor and lead portions the reflected components each decompose into further components respectively aligned with the two principal axes of the lead portion. Thus two components are transmitted back along the lead portion and each represents an addition of components from the components reflected back along the sensor portion. Accordingly, in a preferred form of the invention an intensity measurement of the components reflected back along the lead portion is used as a measure of the phase difference induced between the components travelling in the sensor portion. It is further preferred that the intensity of only one of the components reflected back along the lead portion is measured and more preferably the component aligned with the principal axis orthogonal to that with which the launched beam is aligned.

In an alternate configuration a further lead portion can be optically joined to the free end of the sensor with the respective principal axes rotationally displaced in the manner of the first joint. This results in the components in the sensor portion being decomposed at the joint with the further lead portion into two components respectively aligned with the principal axes of the further lead portion in an analogous manner to the reflected component described above. Accordingly, the intensity of the or each component transmitted to the further lead portion can be used as a measure of the phase difference induced between the components travelling in the sensor portion.

For preference the joint between sensor and lead portion is a "45° joint" which connects the polarisation maintaining fibre portions with their principal axes rotationally displaced by 45°. The joint can be formed in any suitable manner for example by physically joining of two lengths of fibre or by heating and twisting of a length of fibre over a narrow region.

The means to launch a linearly polarised beam preferably comprises a source and suitable linear polariser. Alternatively a polarisation beam splitter can be used. The source is preferably a laser such as a Helium-Neon laser or a single mode laser diode.

It is also preferred that intensity noise generated by the light source is eliminated by using a fraction of the source output to generate a reference signal. Alternatively a d.c. level measurement return beam intensity can be used to eliminate source and loss induced noise.

Adjustment of the bias point of the sensor is preferably effected by applying a small tension to the sensing fibre. The tension can be applied using any suitable known means such as a mechanically adjustable arrangement or a piezo-electric device.

The ultrasonic sensor according to the second aspect of this invention offers several advantages over prior art devices.

Firstly, the induced phase difference is only measured in respect of the beams travelling in the sensor portion of the optical fibre and the lead portion or portions only deliver the initial beam and/or carry a return beam which provides a measure of the phase differences. Accordingly, the sensor is not affected by environment disturbances in the lead portion and feedback compensation of the kind required for prior art devices is avoided.

Additionally, the optical fibre is geometrically flexible and since the lead portion is also unaffected by environmental disturbances the device allows considerable freedom of positioning. The embodiment described above in which the end of the sensor portion is reflective also has the advantage that the sensor portion forms a free end of the fibre which allows further flexibility in location. The embodiment also provides greater sensitivity because the beams in the sensor portion traverse the fibre twice.

The ultrasonic sensor of this invention also offers the following advantages common to both aspects of the invention.

The use of a polarisation maintaining fibre avoids signal fading due to environmentally induced polarisation coupling within the fibre. Feedback control on the input polarisation, such as by adjustment of input optical components, to compensate for environmental disturbances as required in prior art devices is also avoided.

Additionally, the optical fibre sensor being of small dimension does not significantly perturb the ultrasonic field being measured and because the spatial resolution of the sensor depends on overall fibre diameter significantly better resolution than possible with prior art hydrophones can be achieved.

It will also be apparent that because the sensor of this invention is based on detection of light signals instead of electrical signals as in conventional hydrophones, it can tolerate very large electromagnetic interference. This is particularly important in high power high frequency ultrasonic detection.

Further, the detection of induced birefringence allows the ultrasonic sensor of this invention to provide sensitivity over a wide frequency range of ultrasound.

Finally, because of its relative compactness and the geometric flexibility of the sensor this invention provides a basis for a portable ultrasonic detector for field applications.

Some embodiments of this invention will now be described, by way of example only, with reference to the accompanying drawings.

BEST MODES FOR CARRYING OUT THE INVENTION

Figure 1:
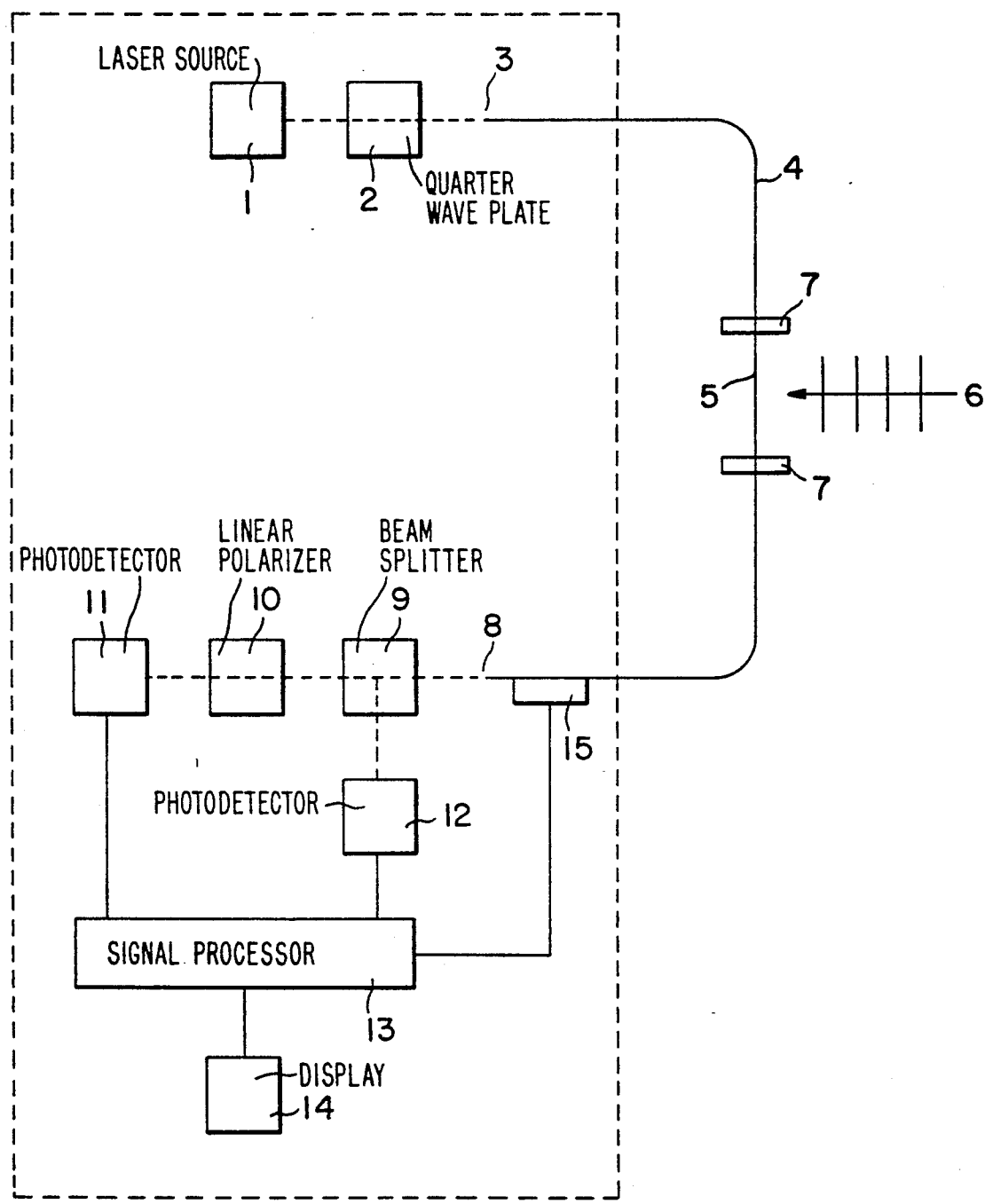
FIG. 1 is a schematic block diagram of an ultrasonic sensor according to a first embodiment of this invention.

As shown in FIG. 1 the ultrasonic sensor of the first embodiment comprises a laser source 1 and a quarter wave plate 2 through which the output from the laser is directed to provide a circularly polarised beam. The laser source can be a gas laser or a laser diode providing a linearly polarised output. The output from quarter wave plate 2 is directed to an input end 3 of a polarisation maintaining fibre 4 of substantially known type. Fibre 4 includes a substantially straight sensing portion 5 which is exposed to the incident ultrasonic wave to be measured schematically shown at 6. Sensing portion 5 is mounted by suitable known means illustrated at 7 so that the fast principal axis of the fibre is aligned with the propagation direction of the ultrasonic wave to achieve maximum induced phase difference. Preferably the sensing portion 5 is sufficiently long to intercept the whole of the ultrasonic beam to be measured.

Light from an output end 8 of fibre 4 is directed to a beam splitter 9. One beam passes through a linear polariser 10 with its principal axis rotationally displaced at 45° to the principal axes of the fibre and the intensity of the transmitted beam is detected by photodetector 11. The intensity of the other beam from beam splitter 9 is detected by photodetector 12. Photodetector 11 and 12 can be of any suitable type for example a PIN photodiode or an avalanche photodiode followed by an electronic amplifier, or a photomultiplier.

The output signals from each of photodetectors 11 and 12 are directed to a signal processor 13 which in turn generates a suitable driving signal for a display unit 14. The display unit can, for example be an oscilloscope, spectrum analyser, a computer or a simple meter.

Bias adjustment of the system is provided by means of a tensioning device 15 which can take the form of a mechanical device or a piezoelectrically operated device (neither of which are shown). A control signal for operating the tensioning device 15 is provided by processor 13.

The operation of the ultrasonic sensor is as follows. A linearly polarised output beam from laser 1 is directed through quarter wave plate 2 to produce a circularly polarised beam which is directed to input end 3 of fibre 4. In this way light beams respectively aligned with each of the principal axes of fibre 4 are launched into the fibre. The phase difference between the two polarised modes is modulated by the incident ultrasonic wave as the beams pass through the sensing portion 5. The output beam is split by beam splitter 9 and one beam passes through linear polariser 10 to photodetector 11. Because the linear polariser is rotationally displaced by 45° with respect to the principal axes of the fibre 4 the resultant output comprises an addition of components of the light beams respectively aligned with each of the principal axes. That is, the two light beams are allowed to interfere.

The d.c. or constant level component of the signal from photodetector 11 varies with the bias phase of the light beams whereas the signal from photodetector 12 is independent of the bias phase. Thus the two signals can be combined by signal processor 13 to provide a control signal for compensation of the phase difference for the effects of environmental disturbances by means of tensioning device 15.

The ratio of the time varying or a.c. component of the intensity signal generated by photodetector 11 to the constant level or d.c. component of the same signal provides a measure of the ultrasonic pressure along the fibre which is independent of light intensity fluctuations. This ratio is calculated by the processor 13 and a driving signal is generated for display 14 to display the measurement in a suitable known manner.

Figure 2:
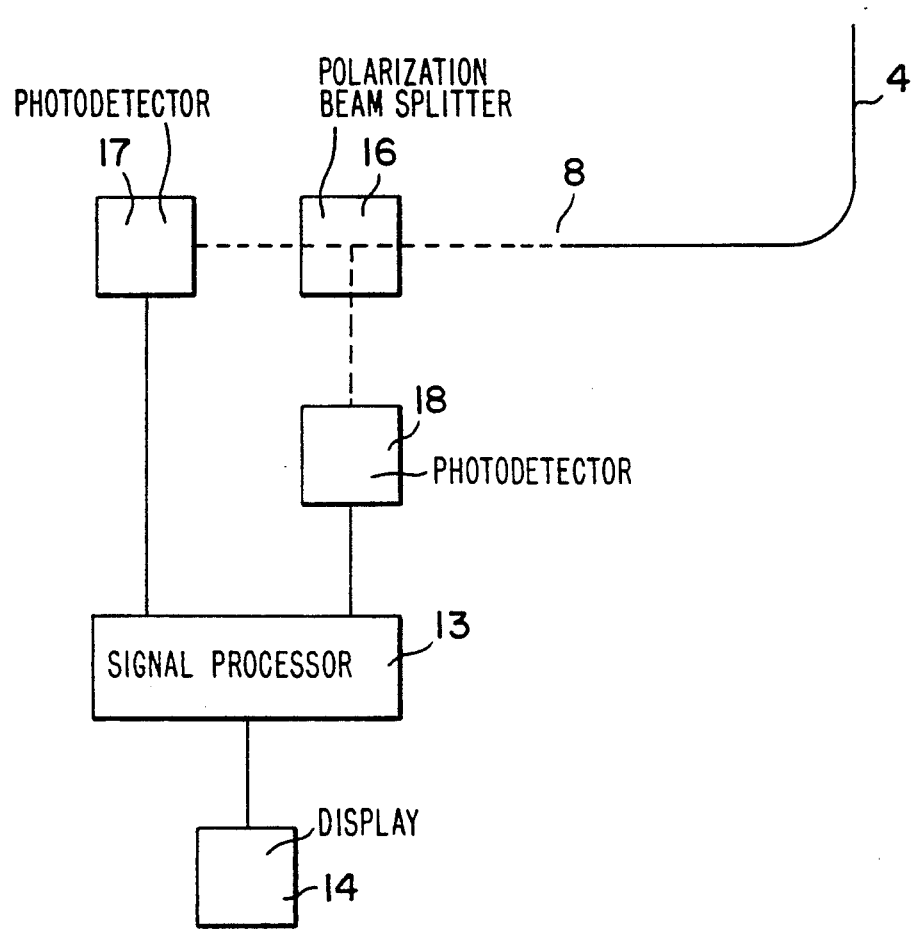
FIG. 2 is a schematic block diagram of a modification to the arrangement shown in FIG. 1.

FIG. 2 shows a modification to the arrangement shown in FIG. 1. Where applicable the same reference numerals have been used to identify the same components. In accordance with this modification light from output end 8 of fibre 4 is directed to a polarisation beam splitter 16 arranged with its principal axes rotationally displaced by 45° to the principal axes of fibre 4. The two light beams produced are of orthogonal polarisation and each comprise an addition of components light beams respectively aligned with each of the principal axes of the fibre. That is, each separate beam contains a component of each of the beams from the polarisation maintaining fibre so that each provides a measure of the phase difference between the beams that have propagated through the fibre. The intensity of each beam is detected by photodetectors 17 and 18. The signals from photodetectors 17 and 18 are processed independently as described above in relation to the signal from photodetector 11. The processed signals are added constructively by processor 13 after inversion of one of the signals to give a measurement of improved sensitivity. As with the embodiment described above a suitable driving signal for display unit 14 is provided by the signal processor 13.

Additionally, the sum of the output signals from the photodetectors 17 and 18 represents the total detected light intensity and therefore can be used as a reference signal for bias control in the same manner as the output signal from photodetector 12 in the embodiment described above. That is, the intensity of the two beams produced by the polarisation beam splitters is compared with the intensity of either one of the beams to provide a control signal for compensation of the phase difference for the effects of environmental disturbance by tensioning of the fibre.

Figure 3:
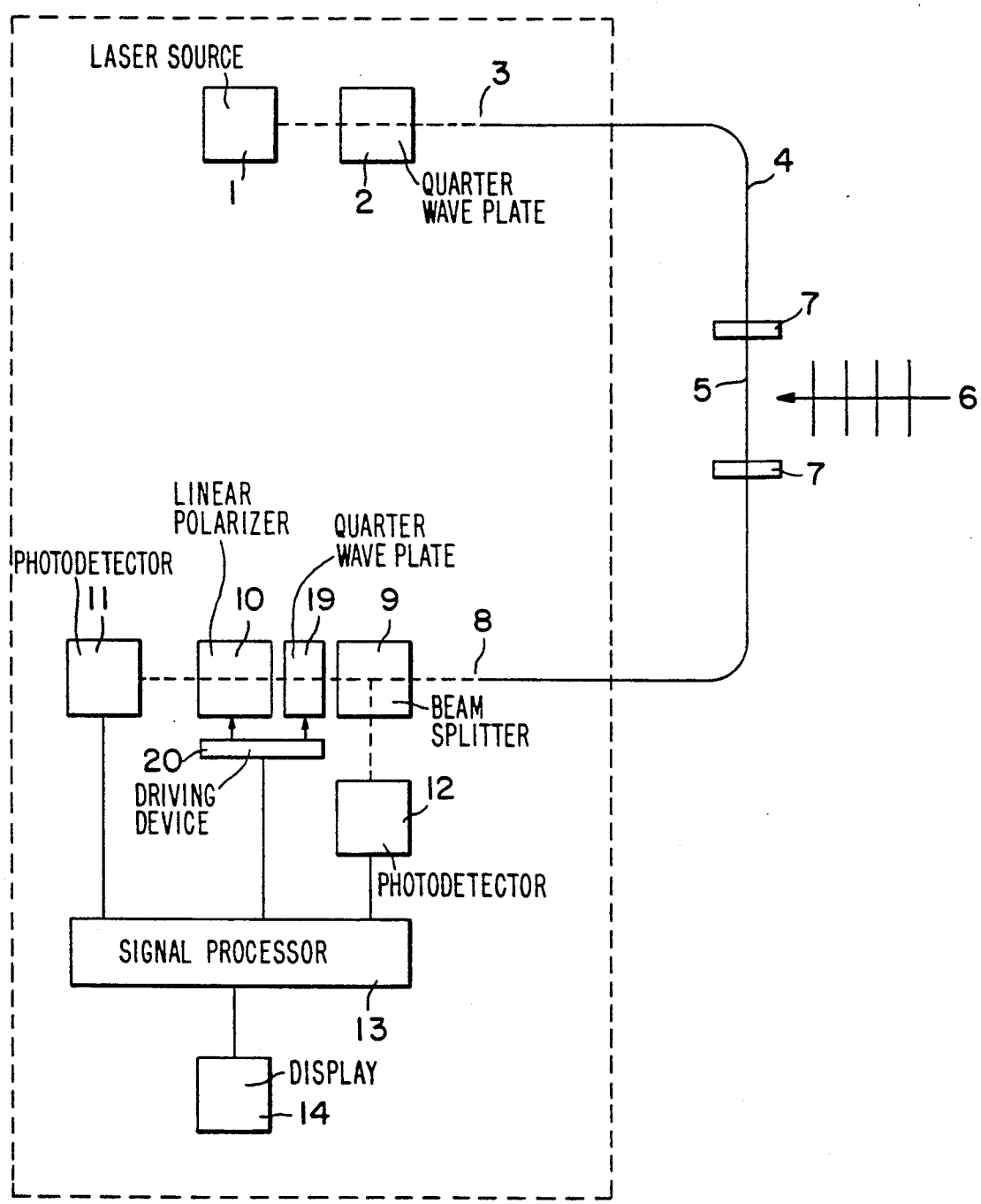
FIG. 3 is a schematic block diagram similar to FIG. 1 showing a further modification.

FIG. 3 shows an alternate arrangement for bias control. Again where appropriate the same reference numerals have been used to identify the same components. In this arrangement a quarter wave plate 19 is interposed between beam splitter 9 and linear polariser 10 and a driving device 20 is provided to simultaneously rotate the principal axes of the quarter wave plate 19 and linear polariser 7 to compensate for environmental disturbances to the fibre. The control signal for driving device 20 is provided by processor 13 in the same manner as the signal is provided for the tensioning device 15 described in relation to FIG. 1.

Figure 4:
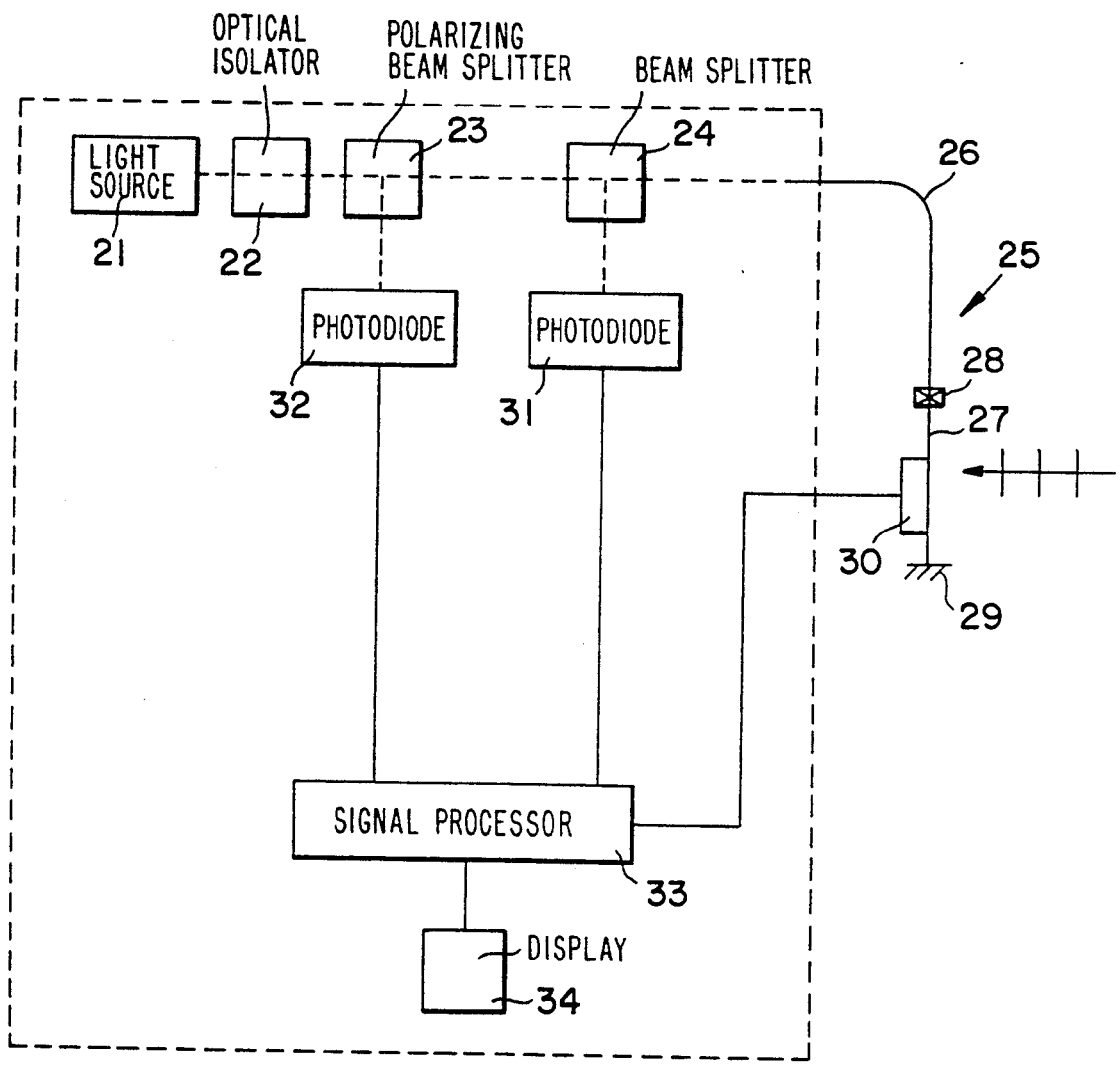
FIG. 4 is a schematic block diagram of an ultrasonic sensor according to a second embodiment of this invention.

FIG. 4 shows an ultrasonic sensor according to a second embodiment of this invention. The ultrasonic sensor comprises a light source 21 which is preferably a Helium-Neon laser or a single mode laser diode coupled via an optical isolator 22 and a polarising beam splitter 23 to a beam splitter 24. The optical isolator 22 prevents light being reflected back to the light source and interfering with its operation. Polarising beam splitter 23 splits the beam from the source into two orthogonally polarised beams only one of which is used. The light transmitted to beam splitter 24 is linearly polarised and the majority of the beam passes through the beam splitter 24 and is launched into a polarisation maintaining fibre 25 in alignment with one of the principal axes. That is to say one of the principal axes of the polarising beam splitter 23 is aligned with one of the principal axes of the fibre 25.

The polarisation maintaining fibre 25 is of a commercially available type and has two orthogonal linear principal axes. The fibre 25 is divided into a lead portion 26 and sensor portion 27 separated by a 45° joint 28. The 45° joint connects the two portions of the polarisation maintaining fibre with their respective principal axes rotationally displaced by 45°. This results in a beam aligned with one principal axis of the head portion travelling from the lead portion 26 to the sensor portion 27 being decomposed into two components respectively aligned with the two principal axes in the sensor portion 27. The end of the sensor portion 27 of the polarisation maintaining fibre 25 terminates in an end mirror 29 which can be provided by way of silvering of the end of the fibre 25. Beams respectively aligned with the two principal axes of the sensor portion 27 travelling from the sensor portion to the lead portion 26 through the joint 28 are each decomposed into components respectively aligned with each of the principal axes in the lead portion 26. The decomposition results in an addition of components from each of the beams travelling in the sensor portion 27 to form each of the beams in the lead portion 26. The intensity of each of the beams launched back into the lead portion 26 thus provides a measurement of the phase difference between the two beams in the sensor portion 27 which decompose.

Tension adjustment of the sensor portion of the fibre is provided by a tensioning device 30 schematically in the drawing and may take the form of a mechanical adjustment or a piezo-electric device (neither of which are shown).

Beam splitter 24 taps off a small fraction of the combined optical power from the return beams and directs this to a photodiode 31. This photodiode generates an electrical signal which provides a measure of the intensity variation due to fluctuations in light source power or losses.

The majority of the return beams passes through beam splitter 24 to the polarising beam splitter 23 which selectively transmits to a photodiode 32 only the beam aligned with the principal axis of the fibre 25 orthogonal to the axis with which the input beam is aligned. Photodiode 32 generates an electrical signal indicative of the intensity variation in the returned orthogonally polarised beam. The output signals from each of photodetectors 31 and 32 are directed to a signal processor 33 which in turn generates a driving signal for display unit 34.

The signal processor 33 processes the signals from photodetectors 31, 32 and provides a driving signal for dispaly 34 in the same manner as described above in relation to the signal processor 13 of the FIG. 1 embodiment.

The operation of the sensor according to this invention is as follows. The sensor portion 27 of the polarisation maintaining fibre 25, that is the portion on the distal side of the 45° joint 28 is located in the ultrasonic field to be measured. Normally the measurements are made in a medium such as water (not shown). A linearly polarised beam is launched into the lead portion 26 of polarisation maintaining fibre 25 aligned with one of the principal axes as described above. When the beam reaches the 45° joint 28 it decomposes into two components each respectively aligned with one of the principal axes of the sensor portion 27. These components travel to the end mirror 29 and are reflected back along the sensor portion 27 to the 45° joint 28 where they in turn decompose to give rise to two beams respectively aligned with the principal axes of the lead portion 26. Each of these beams represents an addition of components from the beams travelling in the sensor portion. The return beams are coupled out of the polarisation maintaining fibre and diverted via beam splitter 24 to polarising beam splitter 23 which directs only the beam aligned with the principal axes orthogonal to that of which the initial beam was aligned to photodiode 32. This photodiode generates an electrical signal is described above.

Since the polarisation maintaining fibre 25 is itself anisotropic an ultrasonic wave incident upon the sensor portion 27 will induce phase changes in the two beams travelling in the sensor portion of the fibre. Since the components launched into the sensor portion 27 are reflected by the end mirror 29 they pass through the portion of the fibre subject to the ultrasonic waves twice and this results in a doubling of the sensitivity. The return beam launched back into the lead portion 26 represents an addition of components from each of the beams that have travelled along the sensor portion and thus the intensity variations of those return beams provide a measure of the phase difference. The tensioning device 30 shown is provided to adjust the bias point of the sensor portion 27 so as to obtain optimum sensitivity. That is to say tensioning is used to essentially shift the operating point on the intensity against phase curve.

The processor 33 provides a measure of the ratio of the intensity of ultrasonic induced variations the return beam to the bias level so as to eliminate the effects of intensity fluctuations and provides a driving signal to display 34 to display a measure of the incident power of the ultrasonic wave on the sensor portion. Because the phase measurement takes place at the 45° joint and the return beam represents essentially an "information signal" the device is not affected by any environmental disturbances to the lead portion. Thus environmental disturbances only affect the sensing portion which is generally very short and thus these disturbances can be neglected and feedback compensation avoided.

A bias level signal for bias adjustment is also provided by the signal processor 33 in the same manner as described for the processor 13 of the FIG. 1 embodiment.

Figure 5:
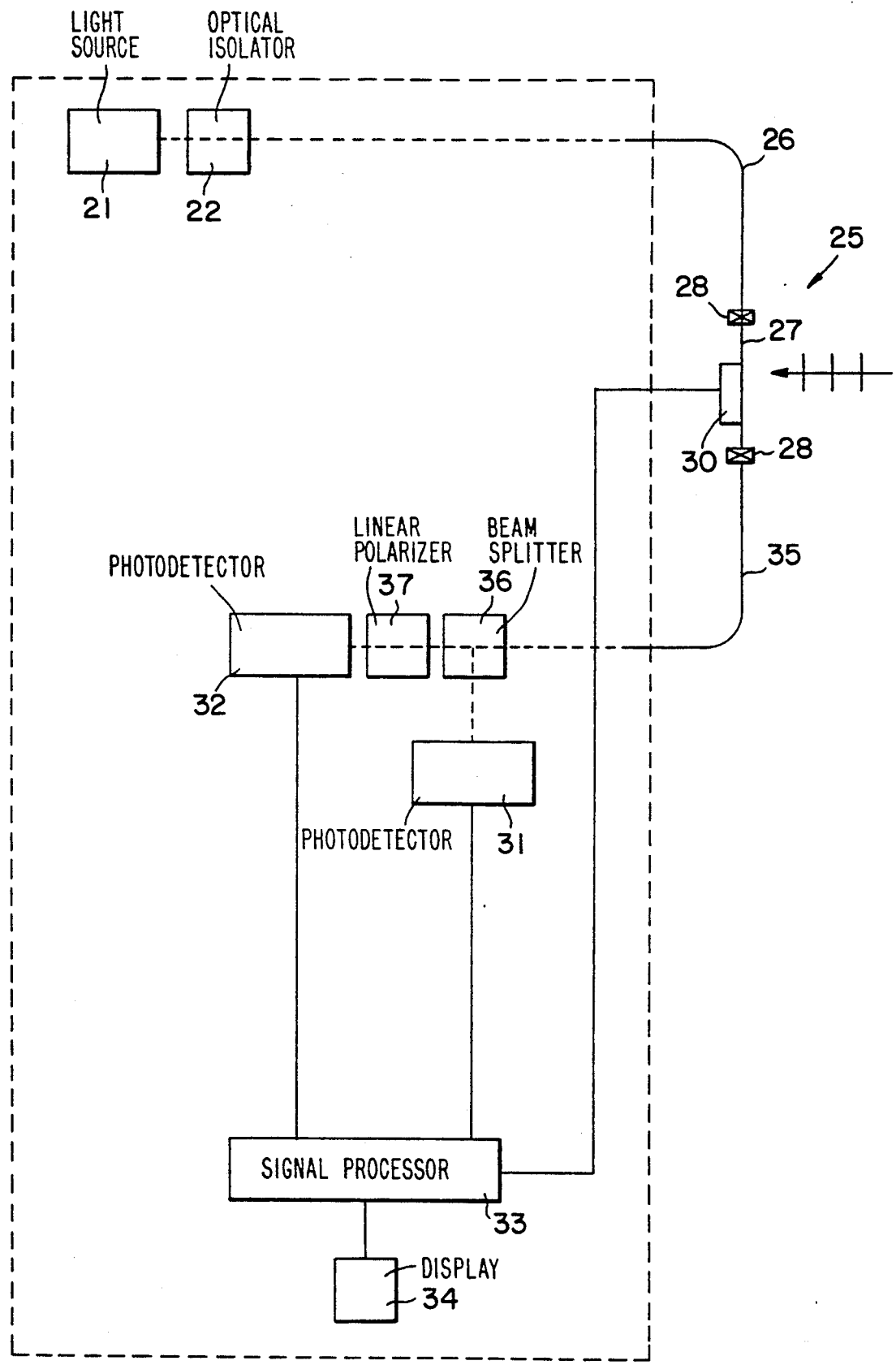
FIG. 5 is a schematic block diagram similar to FIG. 4 showing a modification of the invention.

FIG. 5 shows a modification of the FIG. 4 embodiment of the invention Where appropriate the same reference numerals have been used to identify the components and only the difference in operation are described. As shown instead of terminating the sensor portion with an end mirror, another 45° joint 28 to a further lead portion 35 of polarisation maintaining fibre is provided. The input to lead portion 26 is directly from laser 21 and optical isolator 22. The output from further lead portion 35 is directed via a beam splitter 36 to a linear polariser 37 having its axis rotationally displaced by 45° to the principal axis of the fibre 25. A portion of the beam is directed by beam splitter 36 to photodetector 31 and the beam passing through linear polariser 37 is directed to photodetector 32. The operation of the modified sensor is otherwise identical to that described in relation to FIG. 4.

The foregoing describes only some embodiments of this invention and modifications can be made thereto without departing from the scope of the invention.

We claim:

1. An ultrasonic sensor comprising a polarization maintaining fibre having two orthogonal linear principal axes, an input end and an output end, input means for launching into said fibre light beams respectively aligned with each of said two orthogonal linear principal axes, and output means for determining a phase difference induced between said light beams by ultrasonic waves incident upon a substantially straight intermediate portion of the polarization maintaining fibre, the ultrasonic waves having a propagation direction aligned with a principal axis of said polarization maintaining fibre.

2. An ultrasonic sensor as claimed in claim 1 wherein circularly polarized light is used for launching said light beams respectively aligned with each of the two orthogonal linear principal axes.

3. An ultrasonic sensor as claimed in claim 1 wherein said output means includes a linear polarizer disposed in a path of light emerging from said output end and arranged with a principal axis of the linear polarizer rotationally displaced with respect to the two orthogonal linear principal axes of said polarization maintaining fibre to produce a resultant light beam comprising an addition of components of said light beams respectively aligned with each of the two orthogonal linear principal axes.

4. An ultrasonic sensor as claimed in claim 1 including tensioner provided to adjust the phase difference between said light beams respectively aligned with each of said two orthogonal linear principal axes by tensioning a section of said polarization maintaining fibre.

5. An ultrasonic sensor as claimed in claim 3 wherein said output means includes a quarter wavelength plate, said quarter wavelength plate and said linear polarizer being respectively disposed in the path of light emerging from said output end and means to simultaneously rotate the principal axes of said quarter wavelength plate and said linear polarizer to compensate for environmental disturbances to said fibre.

6. An ultrasonic sensor as claimed in claim 3 wherein an intensity of the light emerging from said output end is compared with an intensity of the resultant light after the light has passes through said linear polarizer for providing a control signal for compensation of the determined phase difference between said light beams respectively aligned with the principal axes of said polarization maintaining fibre for the effects of environment disturbances to said polarization maintaining fibre.

7. An ultrasonic sensor as claimed in claim 6 wherein the intensity of light passed through said linear polarizer is detected for providing a measurement of ultrasonic pressure resulting from an incident ultrasonic wave.

8. An ultrasonic sensor as claimed in claim 7 wherein a time varying component and a constant level component of the intensity of light passed through said linear polarizer are detected and combined to provide a measurement of ultrasonic pressure substantially.

9. An ultrasonic sensor as claimed in claim 1 wherein said output means includes a polarization beam splitter disposed in the path of light emerging from said output end and arranged with one principal axis rotationally displaced with respect to the two orthogonal linear principal axes of said polarization maintaining fibre to produce two light beams of orthogonal polarization each comprising an addition of components of said light beams respectively aligned with each of the principal axes of said polarization maintaining fibre.

10. An ultrasonic sensor as claimed in claim 9 wherein an intensity of each of said two light beams of orthogonal polarization produced by said polarization beam splitter is measured by respectively detecting a time varying component and a constant level component of each light beam to provide two measurements of ultrasonic pressure incident on said polarization maintaining fibre, and wherein said measurements are combined to provide improved sensitivity.

11. An ultrasonic sensor as claimed in claim 9 including a means for measuring and comparing the addition of components of said two light beams of orthogonal polarization produced by said polarization beam splitter with the intensity of either thereof to provide a control signal for compensation of the determined phase difference between said light beams respectively aligned with the principal axes of said polarization maintaining fibre for the effects of environmental disturbances to said polarization maintaining fibre.

12. An ultrasonic sensor as claimed in claim 1 where the polarization maintaining optical fiber is divided into a lead portion and a sensor portion optically joined together with the principal axes of each portion rotationally displaced so that a beam aligned with one principal axis of the lead portion is decomposed into two components respectively aligned with each of the two principal axes in the sensor portion, where said input means launches a linearly polarized beam into the lead portion of said fiber in alignment with one of said axes, and said output means determines the phase difference induced between said components by said ultrasonic waves incident upon the sensor portion.

13. An ultrasonic sensor as claimed in claim 12 wherein a free end of said sensor portion is terminated by reflecting means to reflect said two components back along the sensor portion.

14. An ultrasonic sensor as claimed in claim 12 wherein a free end of said sensor portion is optically joined to a second lead portion with the respective principal axes of said sensor portion and said second lead portion rotationally displaced so that a beam aligned with one principal axis of the sensor portion travelling into the second lead portion is decomposed into two components respectively aligned with each of the principal axes of the second lead portion.

15. An ultrasonic sensor as claimed in claim 12 wherein said sensor portion is optically joined to the lead portion with the principal axes of the respective portions rotationally displaced by about 45°.

16. An ultrasonic sensor as claimed in claim 1, wherein the propagation direction of the ultrasonic wave is aligned with a fast principal axis of the polarization maintaining fibre.

17. An ultrasonic sensor as claimed in claim 1, wherein aligning the fast principal axis with the propagation direction of the ultrasonic wave causes a maximum modulation of the phase difference of principal refractive indices of the polarization maintaining fibre caused by ultrasonically produced mechanical strains.

* * * * *